United States Patent [19]

Hill, deceased et al.

[11] Patent Number: 4,495,675
[45] Date of Patent: Jan. 29, 1985

[54] METHOD AND APPARATUS FOR REMOVING MEAT FROM THE KNUCKLED END OF A BONE

[76] Inventors: Carl J. Hill, deceased, late of Ball Ground, Ga.; by Hazel R. Hill, executrix, Rte. 3, Box 229, Ball Ground, Ga. 30107

[21] Appl. No.: 367,249

[22] Filed: Apr. 12, 1982

[51] Int. Cl.³ .................. A22C 17/04; A22C 21/00
[52] U.S. Cl. ........................... 17/1 G; 17/11; 17/46
[58] Field of Search ................. 17/11, 1 G, 46

[56] References Cited

U.S. PATENT DOCUMENTS

| | | |
|---|---|---|
| 1,435,877 | 11/1922 | Reubold . |
| 2,893,051 | 7/1959 | Massengill ............... 17/1 G |
| 3,261,054 | 7/1966 | Kaplan et al. . |
| 3,364,518 | 1/1968 | Brown et al. ............... 17/45 |
| 3,402,423 | 9/1968 | Helgeson et al. . |
| 3,457,586 | 7/1969 | Zwiep et al. . |
| 4,299,009 | 11/1931 | Tournier . |
| 4,327,463 | 5/1982 | Martin . |

*Primary Examiner*—Willie G. Abercrombie
*Attorney, Agent, or Firm*—Niro, Jager & Scavone

[57] ABSTRACT

A boning apparatus and method is disclosed for removing the meat of an animal or poultry part from an elongate bone over the knuckled joint end. The apparatus includes meat stripping blades with a variable size opening therein for encircling the elongate portion of the bone, and bone holding blades for holding one end of the bone and pulling the bone through the blade opening to strip the meat from the elongate portion of the bone. A sensor detects the proximity of the stripping blade to the knuckle joint end and causes the size of the blade opening to increase by an amount which just allows the knuckle joint to pass therethrough. The meat is thereby cleanly and completely removed from the knuckle joint end of the bone.

13 Claims, 14 Drawing Figures

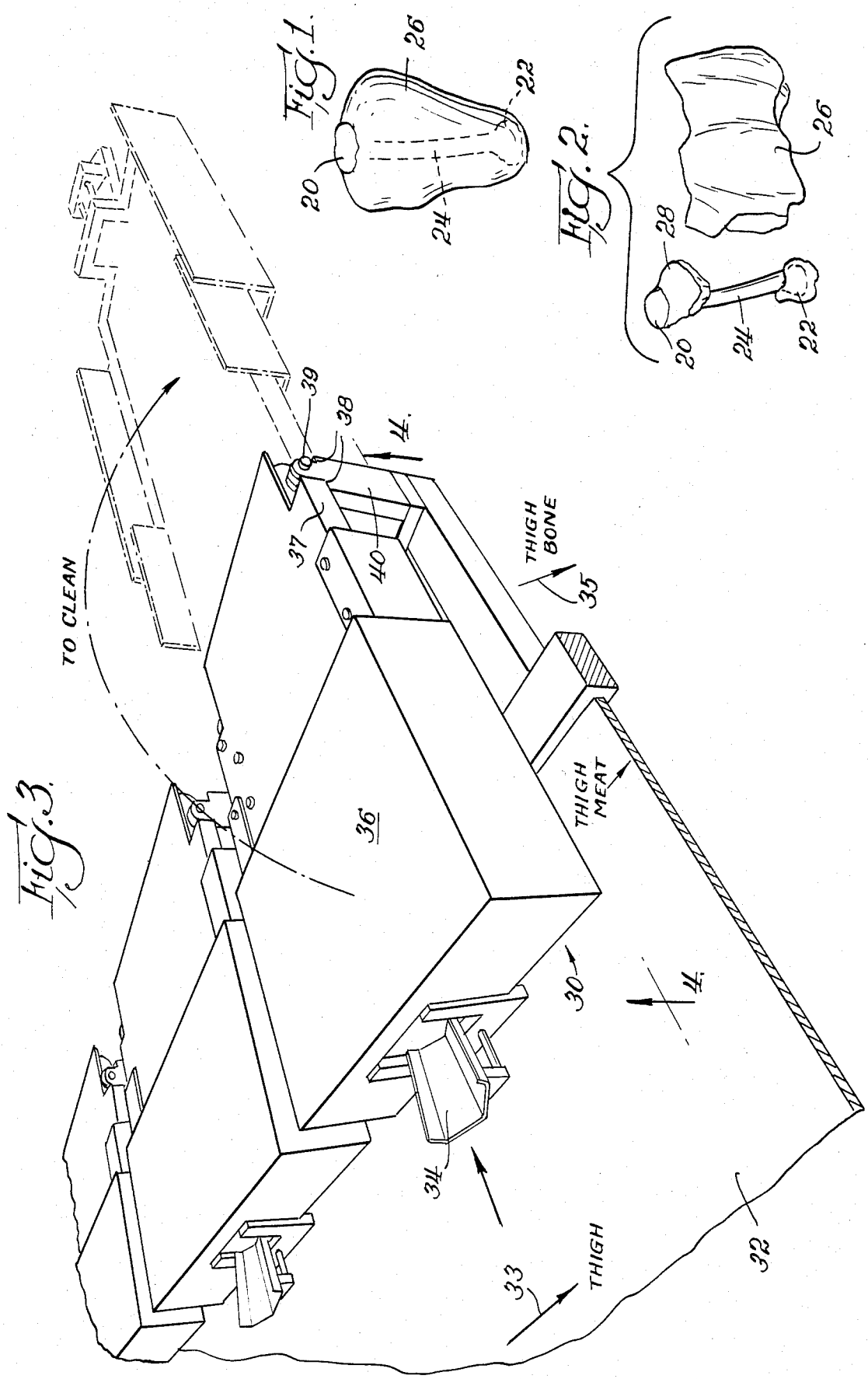

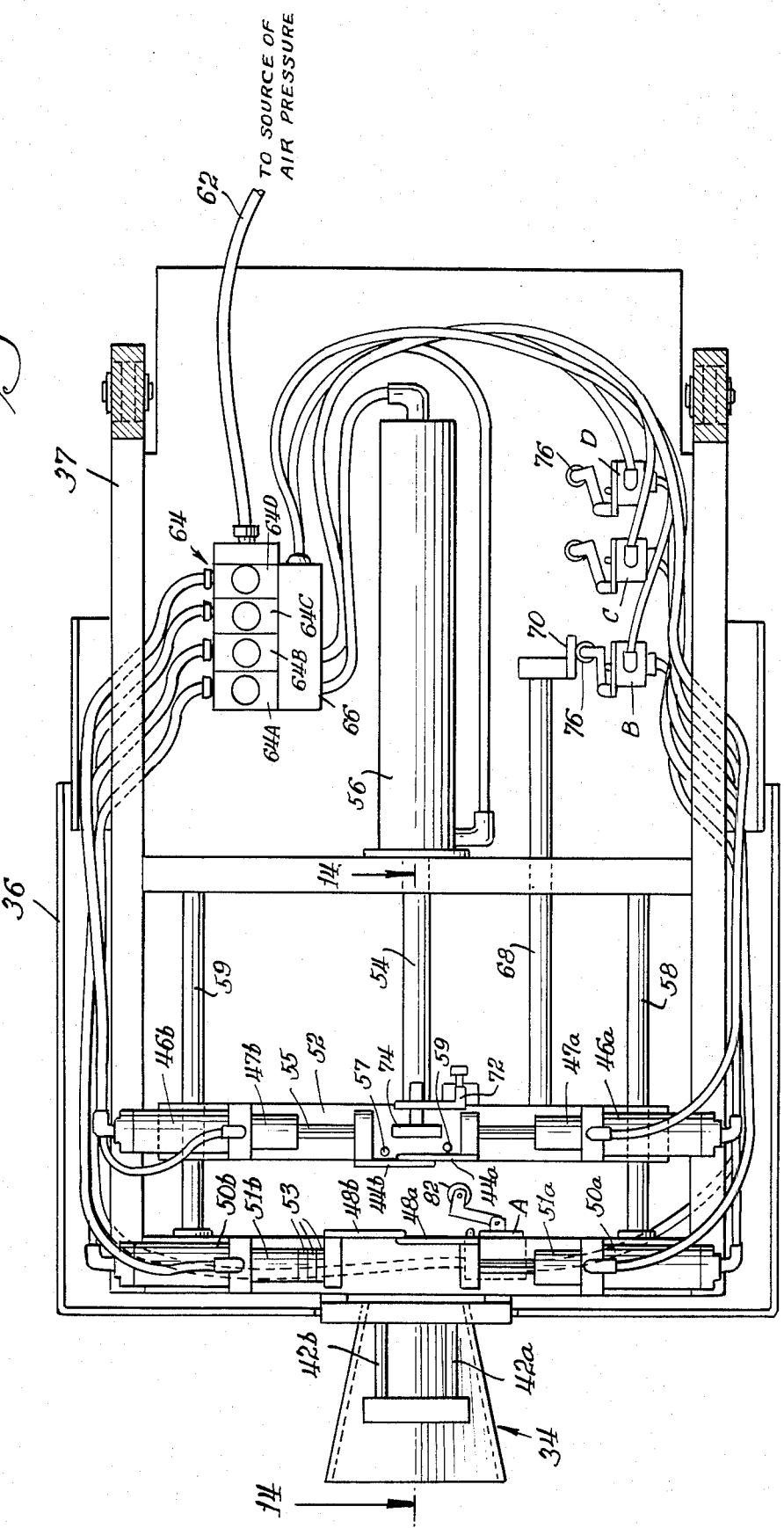

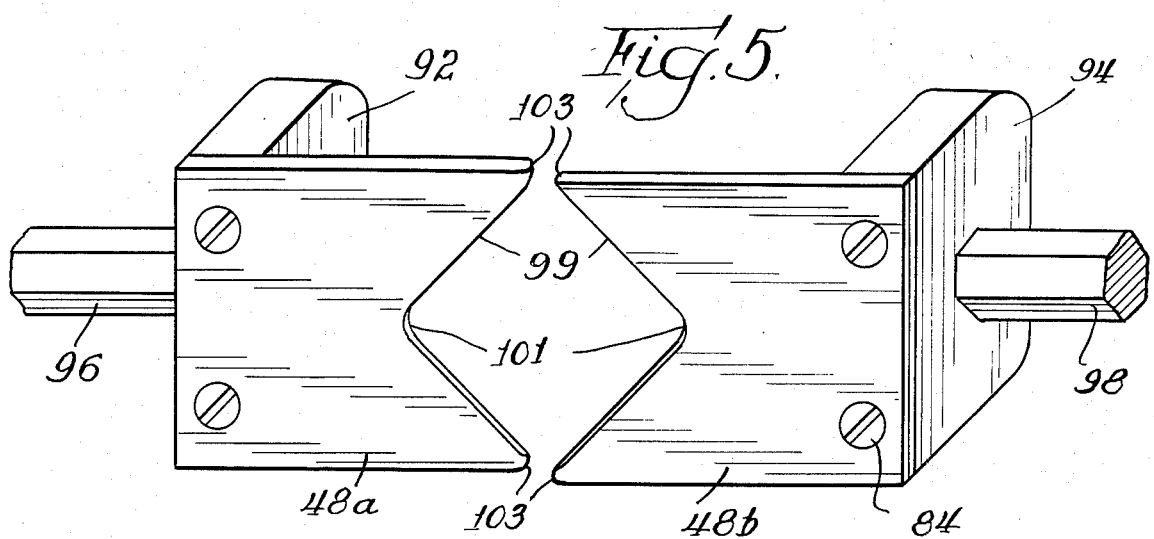
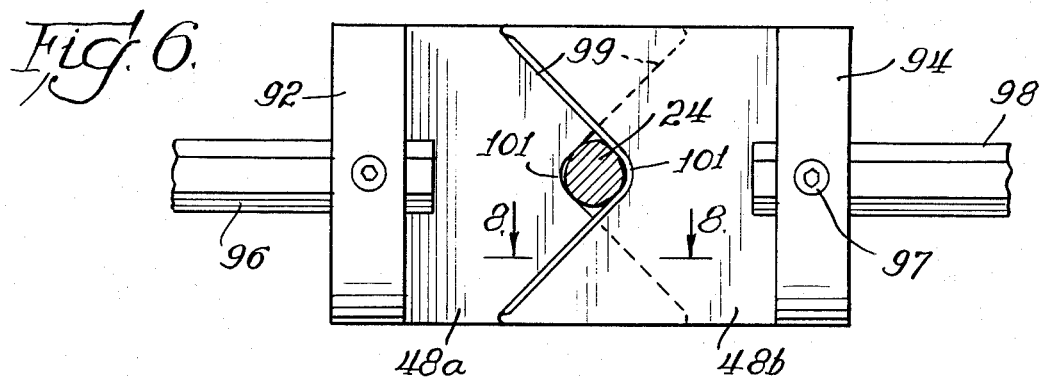
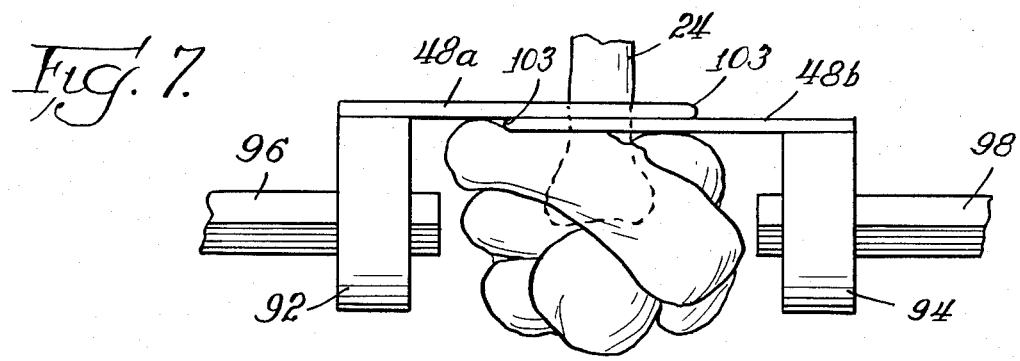
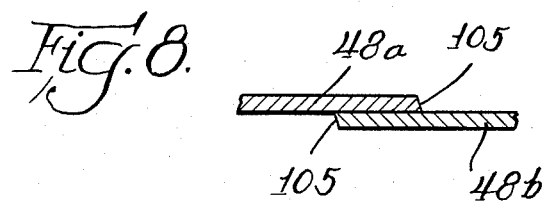

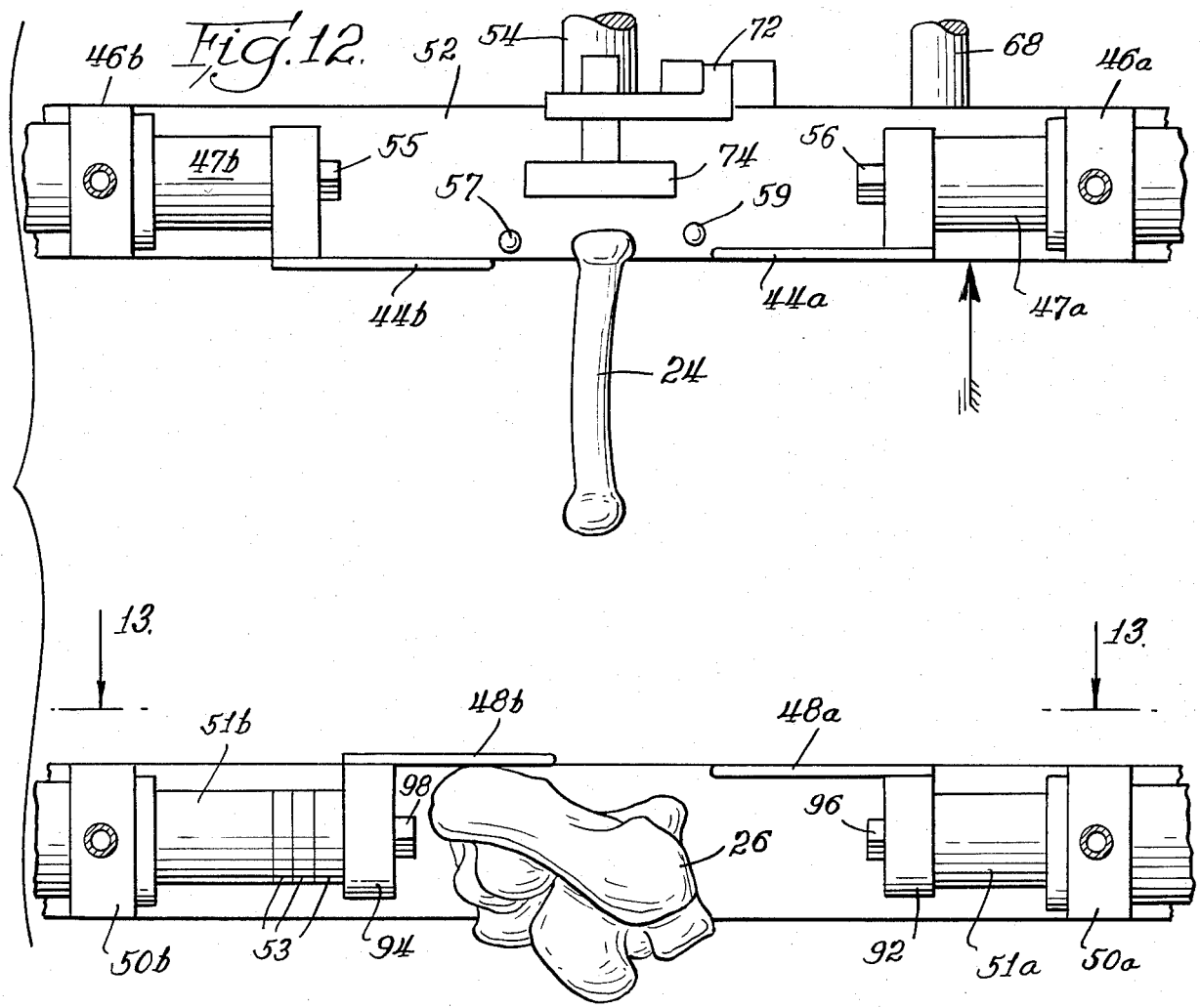
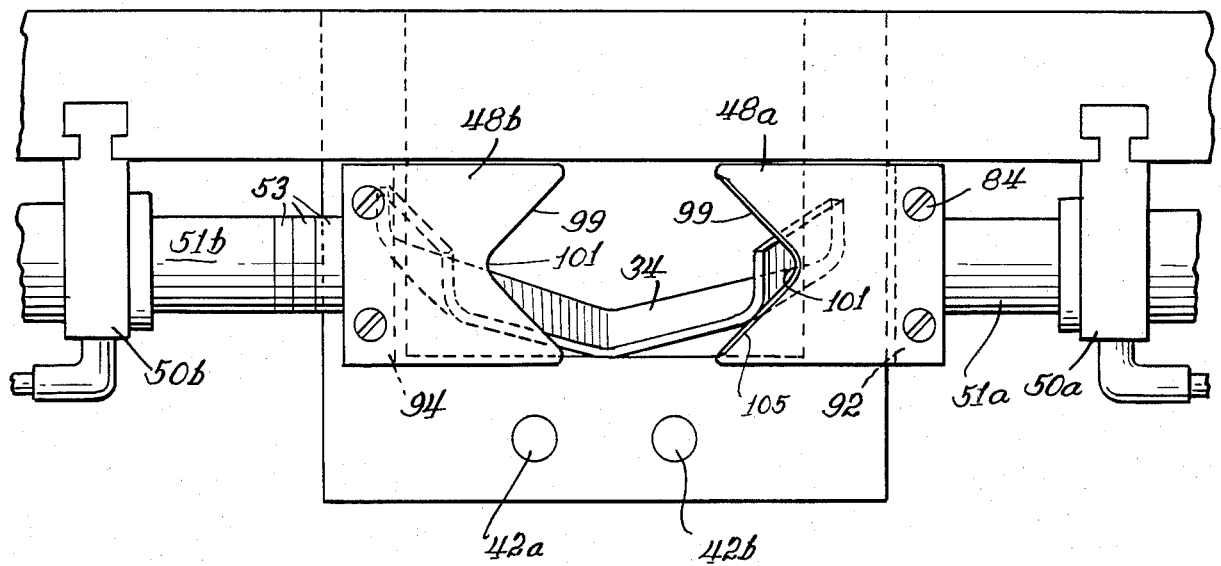

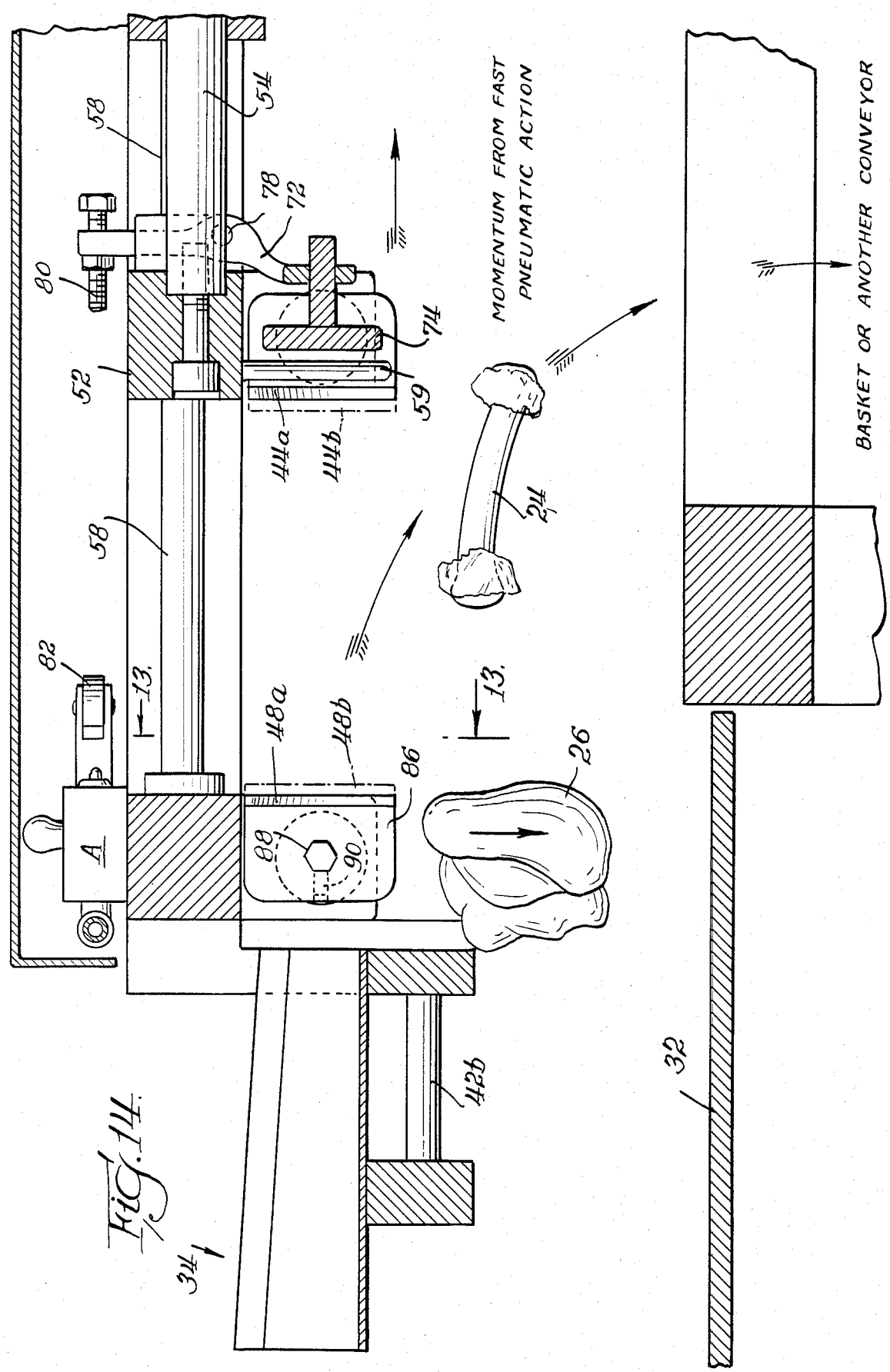

METHOD AND APPARATUS FOR REMOVING MEAT FROM THE KNUCKLED END OF A BONE

BACKGROUND OF THE INVENTION

The present invention relates in general to processing methods and apparatus for removing flesh from the bones of fowl or animals. More particularly, the invention is ideally suited for use in removing the flesh from the type of bone having a knuckle or enlargement at each end of the bone.

The automated removal of raw flesh or meat from a knuckled bone poses special problems. For instance, raw meat has a tendency to adhere to the bone and the removal thereof necessitates a tearing or shearing of the meat from the bone. However, once removed, the meat alone can be cooked or processed without having to waste energy in cooking or further processing the bone. Also, the separated bone can be subjected to additional processing to make bone meal or other byproducts. While it is possible to remove one knuckle from the bone and then pull the bone through the meat, such a solution is particularly objectionable because of the possibility of bone splinters or chips contaminating the meat.

Fully disclosed in U.S. Pat. No. 4,299,009 is one type of boning machine which grips the foot end of an animal bone with a fixed set of holding jaws. Another set of movable jaws closes around the bone at a position near the holding jaws, and is moved away from the holding jaws thereby stripping the flesh from the bone.

Other approaches taken in the prior art involve the use of multiple blades for stripping the meat from the knuckled end of a double-knuckled bone. U.S. Pat. Nos. 3,261,054, 3,402,423 and 3,457,586, for example, utilize stripping blades which are biased against the surface of the bone to effect the removal of the meat from the bone. These techniques are also undesirable because of the high possibility of bone chippings for scrapings being mixed with the meat. U.S. Pat. No. 1,435,877 is a boning device with sharp blades which are rotatable around the bone to remove the meat therefrom. In this latter device the tips of the knife-like blades form an opening to accommodate the bone which opening must be manually adjusted by the operator according to his best guess as to where the knuckle enlargement is located within the meat. Such a device is not practical in today's automated high speed meat processing plants.

Although it is realized that the mentioned boning machines perform a function similar to that of the present invention to be described, it is believed that the invention provides additional advantages. It is therefore a principal object of the present invention to provide a boning machine which pulls a knuckled bone through an apertured opening, and as the knuckle approaches proximate the opening, the opening is caused to enlarge enough just to allow the knuckle to pass therethrough.

It is another object of the present invention to provide a boning machine with blade edges which encircle the bone but which are not biased against the bone.

It is a corollary object of the present invention to provide a boning machine with stripping blades which encircle the bone but which do not rotate around the bone. The meat is separated from the bone by the action of the bone being pulled through the apertured opening.

It is a further object of the invention to simplify both the machine structure and the boning operation by connecting the meat stripping blades, as well as the bone holding blades, directly to the shafts of double-acting cylinders, where such shafts are of the type being non-rotatable within the respective cylinders.

It is another object of the present invention to provide a boning machine with a pair of blades mounted for movement so as to form an aperture opening of a predetermined first size to accommodate the general diameter of the elongate portion of the bone, and a second predetermined size to accommodate the knuckle portion of the bone.

SUMMARY OF THE INVENTION

The present invention provides an improved apparatus and technique for removing raw flesh from a bone of the type having a knuckle-like enlargement at the ends thereof. The invention employs a bone holding set of blades and a meat stripping set of blades. Each blade of a set includes a notch in one edge thereof so that when moved by a cylinder shaft toward the other notched blade the notches form an opening for receiving the bone. The bone holding blades and associated cylinders are further mounted on a carriage which is movable by way of a double-acting cylinder shaft toward and way from the meat stripping blades. Each blade is mounted for movement by a double-acting cylinder shaft and all the cylinders are controlled by a timing mechanism which opens and closes the blades and moves the carriage in a sequence which quickly and efficiently removes the meat intact from the bone.

In the initial phase of the sequence the carriage is moved to a longitudinal position where the bone holding blades and the meat stripping blades are adjacent each other with the blades open so that the openings therein are aligned and ready to receive a poultry thigh to be boned. The insertion of such a poultry part into the blade openings is detected wherein the blade cylinders are caused to move each blade of a pair to a closed position to encircle the bone just inside one knuckled end. The carriage cylinder then moves the bone holding blade pair away from the meat stripping blade pair thereby causing the bone to be pulled through the stripping blade pair opening to shear the meat from the bone. As the stripping blade pair aproaches proximate the other bone knuckle, a timing mechanism causes one stripping blade to move away from the other enough to enlarge the opening therein sufficiently to just allow the knuckle portion to pass therethrough. In this manner the meat is quickly, completely and cleanly removed intact from the bone.

After the removal of the meat and bone portions the carriage continues to move as the timing mechanism causes the bone holding blades to open and project the bone in a direction away from the meat.

Other objects and advantages of the invention will become apparent as the following description proceeds in conjunction with the accompanying drawings.

BRIEF DESCRIPTION OF THE DRAWINGS

FIG. 1 is a perspective view of the thigh portion of a poultry fowl, with the bone shown in phantom, with which the present invention is well suited for processing to separate the meat and bone portions.

FIG. 2 illustrates the flesh and bone portions of the thigh after being processed by the present invention.

FIG. 3 is an isometric view of multiple boning machines in an assembly line environment. Shown in phantom is the cover of one boning machine pivoted to a position to allow access to the internal parts for repair or cleaning.

FIG. 4 is a bottom view of the boning machine, taken along line 4—4 of FIG. 3 which view illustrates the two sets of blades and associated air-operated cylinders for operating the blades and moving the carriage.

FIG. 5 is an isometric frontal view of the stripping blade set illustrating the general construction of the meat stripping blade set.

FIG. 6 is a back view of the stripping blade set moved to an overlapping closed position encircling the elongate portion of the thigh bone.

FIG. 7 is a top view of the stripping blade set in the overlapping closed position.

FIG. 8 is a partial cross-sectional view of stripping blade set, taken along line 8—8 of FIG. 6, showing the scissors-like edge of each A-notch.

FIGS. 9-12 are bottom views of the blades and the movable carriage in various stages of the boning process, which stages exemplify the successive steps in the operation of the machine in accordance with the invention.

FIG. 13 is a plan view of the stripping blades taken along line 13—13 of FIG. 12 and FIG. 14.

FIG. 14 is a cross-sectional view, taken along line 14—14 of FIG. 4, of the present invention illustrating the projection of the bone away from the meat portion of a boned poultry thigh.

DETAILED DESCRIPTION OF THE PREFERRED EMBODIMENT

Figure 9:
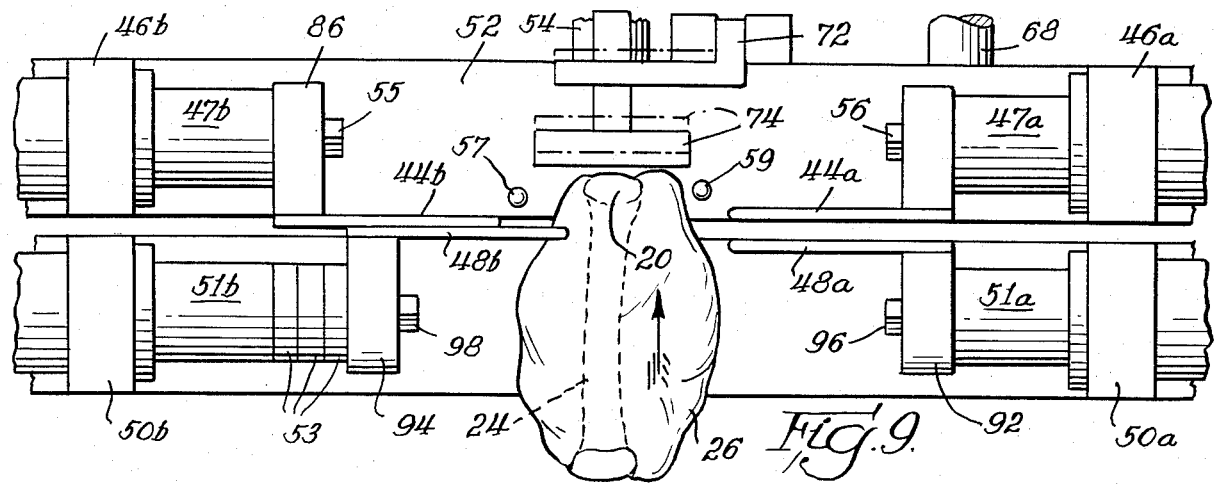

Turning now to the drawings, there is shown in FIG. 1 a poultry thigh, such as that of a chicken, the meat and bone parts of which will be repeatedly referred to in connection with the various process steps to be described. It should be understood at the outset that for convenience, and not of necessity, the invention will be described in terms of use with a chicken thigh. The principals of the invention may be applied with equal advantage to other poultry or animal parts having a knuckle joint or knob-like enlargement over which the meat is to be removed. The terms poultry and fowl are used herein interchangeably.

The type of poultry or animal part to which the invention is principally directed includes a pair of enlargements or knuckles 20 and 22, one of which is located at each end of an elongate bone 24. The aim of the present invention is to remove the raw meat portion 26 as thoroughly as possible from the bone 24 on a rapid, mass-production basis, while minimizing meat damage and waste. FIG. 2 shows such portions after the boning operation has been completed. The meat portion 26 can then be cooked or processed while the bone is discarded or subjected to further separate processing.

In actual practice it has been found that the present invention can bone about thirty-five chicken thighs per minute with only a small amount of waste 28, such as shown in FIG. 2. The amount of meat 28 which cannot be removed from the bone is that portion which covers the knuckle end 20, and also that portion which is bruised by being squeezed between the bone and the blades initially closed therearound.

FIG. 3 generally indicates a number of boning machines as would be utilized in an automated food processing operation. It will become apparent from the following description that the machines, one of which is generally designated 30, are well suited for assembly line operation because of the speed and efficiency at which they operate. Other advantages include the accessibility of the internal parts for repair or cleaning, and the absence of many high precision engineered parts. The detailed operation of the internal parts will be treated more fully below.

ENVIRONMENT OF THE INVENTION

The boning machine 30, according to the preferred embodiment, is utilized with a conveyor 32 which carries chicken thighs or the like on the outer half of the conveyor surface as indicated by arrow 33. The thighs are loaded onto a loading tray 34 which is manually fed into the boning machine. After being boned, the meat falls back onto the other half of the conveyor while the bones are expelled in the direction of arrow 35 into a container (not shown). The boning machine 30 includes a cover 36 to protect the operator from injury during operation and to assist in maintaining sanitary conditions. The boning machine 30 is also pivotal about its rear-most mounting point 39 such that it can be pivoted away from the conveyor area (as generally shown in phantom). The pivotal action of the machine 30 effectively removes it from the proximity of the conveyor 32 and enables one to clean or repair the internal parts. The pivotal movement of the machine is restricted between its operating and cleaning positions by the abutting relationship of the frame 37 and the shoulders 38 of the upright frame member 40.

STRUCTURE OF THE INVENTION

Having set forth the general environment of the present invention, attention is now directed to the internal structure of the invention, as best illustrated in FIG. 4.

The proper perspective of the invention in FIG. 4 appears as one would observe the boning machine 30 from the bottom of FIG. 3, with the conveyor removed for clarity. The machine includes a stainless steel loading tray 34 which is slidably moved into and out of the body of the machine by way of shafts 42a, 42b and ball bushings (not shown) located in the machine frame.

Provided is a set of stainless steel bone holding blades 44a, 44b movable in the plane of the blades into overlapping positions by respective cylinders 46a and 46b. By the use of the term "set" it is meant a pair of opposed blades. However, the holding or stripping functions could as well be accomplished with sets having three or more blades, albeit at the expense of complicating the machine. There is also provided a set of stainless steel meat stripping blades 48a, and 48b comparably operated by respective cylinders 50a and 50b. It should be noted that the holding blade set 44a and b and associated cylinders 46a and b are movable on a carriage 52 by a shaft 54 of cylinder 56. In the preferred embodiment the stripping blade set 48a and b and associated cylinders 50a and b are fixed to the boning machine frame 37. The advantages of moving the one set of blades while maintaining the other set stationary are set forth in detail below. The carriage cylinder 56 is operative to move the carriage 52 on a pair of alignment guide rods 58 and 59.

The cylinders employed in the present invention are air pressure operated double-action devices. The source of air pressure is brought into the boning machine by way of a single flexible pressure hose 62. To facilitate the movement of the various parts of the machine the air pressure hoses within the machine are of the flexible type. Each of the five cylinders, being of the double-action type, require a source of air pressure at each cylinder end, one for extending the cylinder shaft and the other for retracting the shaft.

The boning machine further includes four pilot valve actuating devices designated as A, B, C and D. An actuating arm 68 is fixed to the carriage 52 and includes a shoe plate 70 for sequentially actuating pilot valves B, C and D in response to the movement of the holding blade set mounted on the carriage. Pilot valve A is actuated by rocker arm 72 which in turn is responsive to a thigh being inserted into the machine against a striker plate 74. The cooperation between the rocker arm 72 and pilot valve A can best be visualized in FIG. 14. Associated with each pilot valve is a master valve for distributing the air pressure source to desired cylinders. A plurality of such valves are generally designated at 64. A manifold 66 is provided for exhausting the air pressure used by the various cylinders to the atmosphere.

Each pilot valve, and taking for example pilot valve D, includes a lever arm which is responsive to pressure exerted on a roller 76 to actuate the pilot valve and signal its respective master valve, specifically designated by a similar alphabetic character, to operate the associated cylinder or cylinders. Master valve 64D, for instance, is plumbed to cause the carriage cylinder shaft 54 to be extended, thus returning the carriage to its initial position. When a pilot valve is actuated, the combination pilot and master valves allow the air pressure to force the cylinder(s) plumbed thereto to undergo either a complete push cycle or a pull cycle. In other words, the forward or backward movement of a cylinder shaft is not interrupted, but rather once started, it completes a push or pull cycle.

In achieving the features of the invention, the air pressure hose plumbing connections between the master valves and the various cylinders are important. For instance, the actuation of pilot valve A causes the respective shafts of cylinders 46a, 46b, 50a and 50b to be extended, and shaft 54 to be retracted into cylinder 56. The actuation of pilot valve B by shoe plate 70 during the boning process causes the shaft of cylinder 50a to be retracted. The actuation of pilot valve C causes the respective shafts of cylinders 46a, 46b and 50b to be retracted simultaneously.

It is well within the capability of those skilled in the art to implement the necessary pilot and master valves along with the appropriate air hose connections to the various cylinders to achieve the cylinder shaft movement as herein described. Commercially available pilot valves, master valves and cylinders are readily usable to facilitate such implementation.

It is to be noted, however, that the cylinders operable to open and close each pair of blades are of the nonrotating shaft type. One such type of cylinder includes a hexagonal-shaped shaft to prevent the rotation thereof within the cylinder while being extended or retracted. Central to one aspect of the invention is the absence of guide rails or tracks for guiding the blades together into an overlapping position. The construction and operation of the machine are thereby simplified. Further, the absence of rails or tracks for the blades allows the machine to be readily maintained in a sanitary condition.

To that end, FIGS. 5-7 show two nonrotating cylinder shafts fixed directly to the respective blades of the stripping blade set. For clarity, the shafts are shown without the cylinders or spacer washers. The alignment of each blade of the set is determined solely by the positioning of their respective cylinders. Each cylinder, being securely bolted to the machine frame assures that once a proper alignment has been established a subsequent misalignment is improbable. This aspect alone has independent utility and may be found to be advantageous in other types of boning machines where alignment of stripping or holding blades is crucial to the machine operation.

In the interest of brevity, the following description relating to the construction of the boning machine blades is directed to the stripping blade set. However, it should be noted that the design of the holding blade set, in the preferred embodiment, is identical to the stripping blade set. FIG. 5 particularly depicts the attachment of blade 48b to its blade block 94 by two flat-headed screws countersunk into the surface of the blade. This construction allows each blade to be easily removed from the block and replaced. In this manner, only a single type of blade need be maintained as a spare in the event one of the stripping or holding blades requires replacement. Blade block 94 has a hexagonal-shaped bore centrally located therein for accommodating the hexagonal cylinder shaft 98.

FIG. 6 shows a back view of the stripping blade set. The hexagonal shaft 98 is securely fixed to the blade block 94 by a set screw 97 engageable in a threaded hole extending from the edge of the blade block into the hexagonal bore. The set screw 97 can then be firmly secured against one face of the hexagonal shaft to prevent the shaft 98 from slipping within the block bore. Blade 48a is comparably fixed to cylinder shaft 96. The set screw 97, as well as the set screw in block 92, can be loosened to slidably adjust the blade blocks 94 and 92 (and thus the blades 48a and b) on the respective shafts to center the blades to receive a chicken thigh, and also to adjust the size of the notch opening in the blade leading edges when the blades are in a fully closed position.

It is significant to note from FIG. 7 that the cylinder shafts 96 and 98 are in axial alignment, yet the respective blades 48a and 48b close to an overlapping relationship. This is a result of blade block 92 being constructed somewhat differently than blade block 94. Particularly, the dimension of blade block 92 between the cylinder shaft bore and the edge where blade 48a is fastened, is greater than that of blade block 94. The difference in this distance is above equal to the thickness of the blade 48a. This dimensional difference in the block construction laterally displaces blade 48a with respect to blade 48b so that the two can close to an overlapping position rather than an end abutting position. An alternative, of course, would be to construct identical blade blocks and laterally displace the respective blade cylinders to achieve the overlapping relationship of the blades.

Each blade of the machine includes numerous structural aspects which aid in either holding a thigh bone or stripping the meat therefrom. Particularly, a right angle V-notch 99 is cut into the leading edge of blade 48b which, in cooperation with a similar V-notch in blade 48a, defines an opening within the blade set which is variable in size depending on the extension and retraction of the cylinder shafts. The apex of each V-notch is rounded at 101 to conform to the general curvature of a thigh bone. This rounded apex facilitates the capability of the blade set to encircle the bone when closed therearound. The size of the opening defined by the V-notches is largest when each shaft 96 and 98 are retracted. The associated cylinders 50a and 50b are operative to retract the respective shafts 96 and 98 in the initial phase of a boning cycle to open the blades to receive into the opening the chicken thigh part.

An intermediate blade opening is provided by causing one cylinder shaft to be extended and the other shaft to be retracted. It will be seen later than this intermediate opening in the stripping blade set is sufficient to allow a knuckle joint to closely pass therethrough. The smallest size blade opening occurs when the shaft of each cylinder 50a and b is completely extended. FIG. 6 shows the stripping blade set closed to such a predetermined size opening whereby the blade set encircles the elongated portion 24 of the bone without gripping it. The bone holding blades 44a and b are adjusted to a similar size smallest opening such that the blade set pulls on the knuckle joint 20 rather than on the elongate portion 24 of the bone. The various sizes of blade openings of each blade set may need to be readjusted when processing another type of poultry, such as a turkey, to prevent the blades from closing too tightly around the bone and perhaps scraping or chipping the bone during the boning process. Because the shaft of each cylinder (46a, 46b, 50a, 50b) is maintained either in a completely extended or retracted position, at least three predetermined size blade openings are thus possible.

The size of the blade opening in each set of blades is initially adjusted by the set screws as noted before. The stroke of each cylinder shaft is modified by the use of thick spacer washers 47a, 47b, 51, and 51b (FIG. 9) applied over the shafts of the respective cylinders. By the use of these spacer washers, the retraction of each shaft is limited to prevent an unnecessarily wide blade opening. The elimination of unnecessary cylinder shaft travel also permits the boning machine to execute a boning cycle in a shorter period of time. The spacers 53 on the shaft of cylinder 50b will be further explained below.

Another structural aspect of the blade construction which aids in permitting the blades of a set to close to an overlapping position is the bevelled edges 103 of foremost points of each blade. FIG. 5 illustrates such bevelling on the inside surface of each blade point. As each blade slides together, the complementary bevels preclude an abutment of blade edges which, if permitted to occur, could chip the metal blades and contaminate the meat. FIG. 7 shows a top view of the stripping blade set in an overlapping closed position, with the blade point bevels 103.

FIG. 8 illustrates the scissors-like edge 105 cut within each A-notch. The leading edges are not square but are angled at above eighty degrees so that a good shearing action occurs when the blades slide together in an overlapping fashion. Moreover, the scissors-like edges assure a clean cut through the meat thereby reducing damage to the meat due to brusing, and also prevent an accumulation of meat between the blades. Importantly, the bone is pulled through the meat stripping blades 48a and b, in the direction of arrow 107, and against the sharp edges of the blades to effect a clean separation of the meat from the bone. On the bone holding blade set 49a and b, the sharp edges of the scissors-like edge 105 pull against the knuckle joint.

Figure 10:
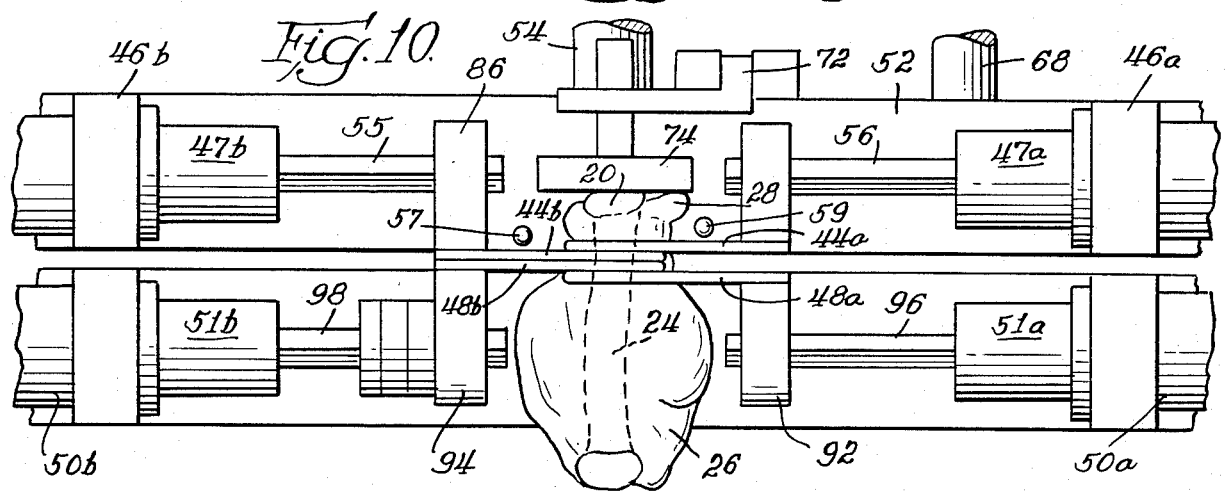
Figure 11:
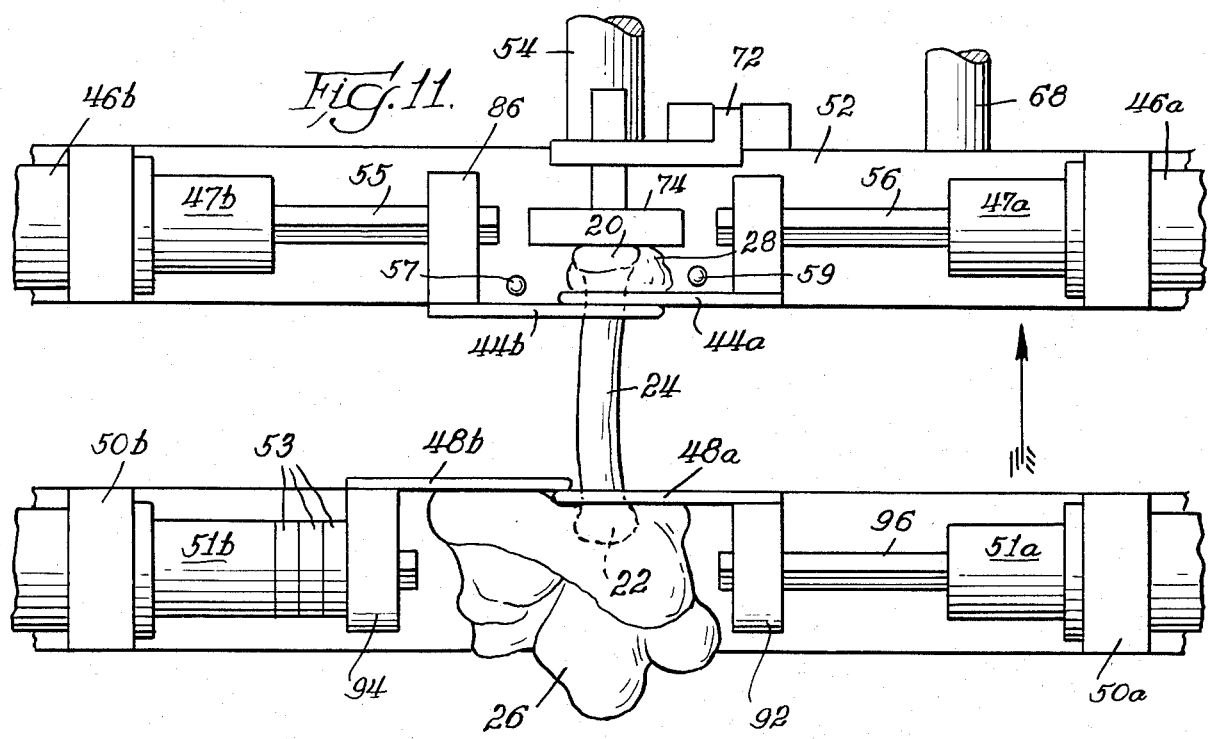

As shown in FIGS. 9-11, an optional pair of wiper rods 57, 59 are positioned adjacent holding blades 44a and 44b to remove any loose meat accumulated on the blades when the blades move to an open position.

In actual practice it has been found that an air pressure source of 50 pounds per square inch establishes a cylinder shaft speed which allows a smooth cooperation between the blade sets to effect the removal of meat from a thigh inserted into the machine.

FUNCTIONAL OPERATION OF THE INVENTION

Before proceeding with the description of the boning machine in conjunction with FIGS. 9-12, prefatory reference should be made to FIG. 14. An animal or poultry part, such as a chicken thigh, is loaded into the tray 34 and both are then pushed into the boning machine. While FIG. 14 illustrates the boning process in its latter stages, it should be visualized for the present discusssion that the carriage 52 and the striker plate 74 are extended to their initial position by the full extension of cylinder shaft 54 (leftward in FIG. 14). In this initial position the adjustment screw 80 is near roller 82 of pilot valve A. It can further be visualized that the insertion of a chicken thigh into the machine causes one end thereof to press against the striker plate 74 which, throug the pivotal action of rocker arm 72 at pin 78, causes the adjustment screw 80 to actuate pilot cylinder A. This action sets into motion the boning cycle of the machine.

In numerical ascending order FIGS. 9-12 illustrate the various phases of the boning process wherein the thigh meat 26 is removed from the thigh bone 24 over the knuckle end 22 thereof.

FIG. 9 shows the first phase of the boning operation where the bone holding blades 44a 44b are completely open, as illustrated by the complete retraction of the respective cylinder shafts. The stripping set of blades 48a, 48b are comparably open and longitudinally moved to a position adjacent the holding blades. Because of the three additional spacers 53, stripping blade 48b is prevented from opening as fully as the other blades. It is significant to note that the spacing between the striker plate 74 and the open holding blades 44a, 44b is sufficient to accommodate the foremost knuckle 20 of the thigh. Once inserted into the boning machine in the direction indicated by the arrow, the thigh presses against striker plate 74 to activate pilot valve A, as before described. The resulting movement of the striker plate 74 is shown in broken lines in FIG. 9.

The meat stripping operation will be more fully understood by a brief reference to the stripping blade configuration, as shown in FIG. 13. It has been found that the V-notch 99 within the leading edge of each stripping blade 48a, 48b is effective in stripping the raw meat from a chicken thigh bone. Other leading edge configurations may be found to be effective in removing raw or cooked meat from other types of animal or poultry bones. The V-notch blade edge configuration is employed in both the holding set of blades and the stripping set of blades so that two sets of blades do not need to be kept as spares. Because the parts of the machine coming in contact with the meat are required to be made of stainless steel, a reduction in parts inventory and cost is thus achieved.

It was previously noted that the movement of the cylinder shafts are controlled only insofar as they are completely extended or completely retracted. Because of this aspect, the opening existing in a set of blades, when in the closed overlapping position, is controlled either by the depth the V-notch is cut into the blade or by the position of the blade block on the cylinder shaft. Therefore, when processing, for example turkey thighs which have larger bones than that of a chicken, a larger V-notch opening must be provided, or the blade blocks adjusted further back on the respective cylinder shafts.

With the foregoing in mind, reference should now be made to FIG. 10 where there is shown the next phase of the boning operation. The chicken thigh being inserted into the machine and having actuated pilot valve A actuates master valves 64A which first, extends all the blade associated cylinder shafts as shown in FIG. 10, and second, moves the carriage 52 (with the holding blades) away from the stripping blades as shown in FIG. 11. FIG. 10 illustrates the shafts of all four cylinders fully extended and, in order to minimize the amount of meat waste left on the bone, it is necessary that both sets of blades completely close before movement of the carriage 52 occurs. In the illustrated embodiment, it has been found that no special provisions are needed to assure that the sets of blades close before carriage movement occurs. The small blade cylinders and also the relatively short stroke of the shafts, as compared to that of the carriage cylinder 56, allows the air pressure to overcome the inertia of the blade cylinder shafts and blades to accomplish a natural closure of the blades before the carriage cylinder shaft commences movement of the heavier carriage.

In accordance with the features of the present invention there is illustrated in FIG. 10 only the small amount of meat 28 which is not stripped from the bone during the boning operation. This unavoidable waste amounts to that portion of meat which surrounds the knuckle 20.

In FIG. 11 the carriage cylinder shaft 54 has moved the carriage 52 (and thus the holding blades) away from the stripping blades by a length substantially equal to that of the elongate portion 24 of the bone. Further shown is that portion of meat 26 which has been removed from the bone and is collected on the outer side of the stripping blades 48a, 48b. At this point in the boning cycle the meat 26 is still attached to knuckle 22. As seen in FIG. 4, a continuation of the movement of the carriage 52 engages the shoe plate 70 with the roller 76 to cause the actuation of pilot valve B. As noted previously, pilot valve B causes master valve 64B to supply air to cylinder 51b to thereby quickly retract stripping blade 48b. However, because of the additional spacers 53, the retraction of stripping blade 48b is limited which thus only enlarges the opening within the stripping blades 48a, 48b by a selected amount sufficient to accommodate the knuckle 22 while the meat stripping operation is continued.

It should be realized that the retraction of stripping blade 48b occurs while the carriage 52 is still moving. FIG. 11 particularly depicts this point in the cycle. The continued movement of the carriage 52, with its set of holding blades 44a, 44b, pulls the bone 24 through the now-enlarged opening in the stripping blades. The movement of the knuckle 22 through this opening allows the stripping blades 48a, 48b to continue to cleanly and substantially remove the meat from the bone. Then, the carriage continues to move with the bone held in the holding blades while the meat falls to the conveyor where it is subsequently carried away. (Since FIG. 11 is a bottom view, the separated meat falls toward the reader onto the conveyor).

The continued rearward movement of the carriage 52 causes the shoe member 70 to eventually actuate pilot valve C (FIG. 4). FIG. 12 illustrates the effect of pilot valve C actuation, which results in the complete retraction of the remaining three cylinder shafts 46a, 46b and 50a. The opening of the holding blades allows the bone 24 to be released and the meat to fall, if it has not already done so. The carriage, moving in the direction of the arrow, causes the bone 24 to be projected rearward upon its release. This aspect is shown in FIG. 14, wherein the meat is deposited on the conveyor 32 while the bone is projected rearward into a container or other collecting means.

The movement of the carriage 52 eventually causes the shoe 70 to operate pilot valve D. Pilot valve D controls master valve 64D to supply air to the carriage cylinder 56 thereby fully extending shaft 54 to restore the carriage to its initial position. Upon return of the carriage to its initial position. The boning machine with the carriage in its initial position, and all blades open, is now ready to be triggered by another thigh thereby initiating another boning cycle.

From the foregoing it should be appreciated that the width or number of spacers 53 is related to the general diameter of the knuckle end of the particular animal or fowl part to be bonded. In addition, the pilot valves B, C and D can be adjusted along the length of the machine frame 37 to synchronize the various blades to open at various times according to the length (and thus the type of animal or fowl part) of the bone being processed.

While the various phases have been described as various discrete steps, it should be realized that the phases occur smoothly and completely in about one second. It should be understood that in the preferred embodiment of the invention only stripping blade 48b is operative to open and allow the knuckle 22 to be pulled through the opening within the stripping blades. With a modification to the machine, it should be realized that the same result can be obtained by opening both blades 48a and 48b by an amount sufficient to allow the knuckle portion to pass therethrough. Also, it may be desired to arrange the carriage and blades so that the stripping blade set moves longitudinally rather than the holding blade set. These types of modifications are considered to be well within the scope of the present invention.

From a mechanical point of view, the present invention is extremely simplified by employing linear movement of the blades through direct connection with the respective cylinder shafts. A further advantage is achieved by using conventional double-acting air cylinder with shafts mounted for coplanar movement. In this manner the total size of the boning machine may be made small enough such that, with a single flexible hose connection to a pressure source, the machine can be pivotally mounted to facilitate cleaning or repair, or be easily replaced with another boning machine should one be found to be defective. These advantages can well be appreciated in assembly line meat processing plants.

From a functional point of view, the operation of the present invention is straightforward as seen by the series of phases through which a thigh is quickly processed to complete a boning cycle.

In summary, there is provided a method and apparatus whereby a unique set of holding and stripping blades enclose around the bone just inside one knuckle thereof. The bone is then drawn by the holding blade set through the stripping blades to effect a removal of the meat from the elongate portion of the bone. As the set of stripping blades and the other knuckle approach proximate each other, the opening within the stripping blade set is widened to accommodate the other knuckle. The widening of the opening within the stripping blade is timed such that the other knuckle passes therethrough while continuing the meat stripping operation. The machine thereby effects a clean and substantial removal of the meat from the bone. The blades are fastened to respective cylinder shafts of the nonrotatable type. The movement of each blade pair to an aligned overlapping closed position, without the need of guide channels, is thereby provided.

Shown and described above are the functional features of the invention as applied to the preferred embodiment. It should be understood that various omissions, substitutions, and changes in form and detail, such as suggested above, may be made by those skilled in the art without departing from the spirit and scope of the invention. It is the intention to therefore be limited only by the scope of the following claims.

What is claimed is:

1. Apparatus for boning animal or poultry parts having an elongate bone with a knuckled joint at each end thereof, comprising:
   blade means having an adjustable size opening for encircling the bone of said animal or poultry part to strip the meat therefrom, said opening being adjustable to a first predetermined size to accommodate the elongate portion of said bone, and adjustable to a second predetermined size to accommodate the knuckle joint;
   means for adjusting the size of said opening to said first or second predetermined sizes;
   holding means for holding the bone at one knuckle joint and for pulling said bone through the opening in said blade means;
   a frame having a stationary member and a movable carriage member movable during a boning cycle, said stationary member having fixed thereto one of said blade means or said holding means, and said carriage member having fixed thereto the other said blade means or said holding means, wherein the movement of said holding means away from said blade means effects the removal of meat from the bone; and
   sensor means responsive to the start of a boning cycle for controlling said means for adjusting to adjust the opening to said first predetermined size, and responsive to the position to said blade means relative to said holding means for controlling said means for adjusting to adjust the opening to said second predetermined size when said blade means is moved from said holding means by a distance substantially equal to the length of the elongate portion of said bone.

2. The apparatus for boning animal or poultry parts as set forth in claim 1 wherein said sensor means includes means fixed to the stationary member of said frame at a particular location for detecting the movement of said carriage means thereby.

3. The apparatus for boning animal or poultry parts as set forth in claim 1 further including means for detecting an animal or poultry part placed in said apparatus to thereby initiate said boning cycle.

4. The apparatus for boning animal or poultry parts as set forth in claim 1 wherein said holding means is fixed to said carriage member and said blade means is fixed to said stationary member, and wherein said apparatus further includes means for detecting the end of said boning cycle wherein said holding means releases said bone.

5. Apparatus for boning animal or poultry parts having an elongate bone with a knuckled joint at each end thereof, comprising:
   blade means having an adjustable size opening for encircling the bone of said animal or poultry part to strip the meat therefrom, said opening being adjustable to a first predetermined size to accommodate the elongate portion of said bone, and adjustable to a second predetermined size to accommodate the knuckle joint;
   means for automatically adjusting the size of said opening to said first predetermined size and to said second predetermined size in a boning cycle;
   holding means for holding the bone at one knuckle joint and for pulling said bone through the opening in said blade means; and
   means operatively associated with said blade means and independent of said adjusting means for varying said second predetermined size of said opening which accommodates the knuckle joint.

6. The apparatus for boning animal or poultry parts as set forth in claim 5 further including a frame having a stationary member and a movable carriage member movable during said boning cycle, said stationary member having fixed thereto one of said blade means and holding means, and said carriage member having fixed thereto the other said blade means and holding means, wherein the movement of said holding means away from said blade means effects the removal of meat from the bone.

7. The apparatus for boning animal or poultry parts as set forth in claim 6 further including means for detecting an animal or poultry part placed in said apparatus to thereby initiate said boning cycle.

8. The apparatus for boning animal or poultry parts as set forth in claim 7 wherein said blade means is stationary and said holding means moves relative thereto, and wherein said apparatus further includes means for detecting the end of a boning cycle wherein said holding means releases said bone.

9. Apparatus for boning animal or poultry parts having an elongate bone with a knuckle joint at each end thereof, comprising:
   holding means for holding said bone at one knuckle joint end;
   a pair of blades for stripping the meat from said bone, said blades defining an opening adjustable to a first predetermined size to accommodate said animal or poultry part, a second predetermined size to accommodate the general diameter of the elongate portion of said bone, and a third predetermined size to accommodate the general diameter of the other knuckle joint; and
   means for automatically adjusting the opening of said blade means between said three predetermined sizes in a single boning cycle, including means for moving only one of said blades for adjusting said opening from said second predetermined size to said third predetermined size.

10. The apparatus for boning animal or poultry parts as set forth in claim 9 further including means for adjusting the amount of movement of said one blade for varying said third predetermined size of said opening.

11. Apparatus for boning animal or poultry parts having an elongate bone with a knuckled joint at each end thereof, comprising:
   a first set of blades for grasping said bone proximate one knuckled joint so as to prevent said joint from passing therethrough, said blades being linearly movable for varying the size of an opening in said blades for grasping the bone;

first cylinder means with first shaft means being operably extendible and retractable, said first cylinder means having means for preventing rotation of said first shaft means, and said first shaft means being connected directly to said first set of blades to effect said linear movement;

a second set of blades for stripping the meat from said bone, said second set of blades being linearly movable for varying the size of an opening in said blades through which said bone is pulled; and second cylinder means with second shaft means being operably extendible and retractable, said second cylinder means having means for preventing rotation of said second shaft means, and said second shaft means being directly connected to said second set of blades to effect said linear movement thereof.

12. The apparatus for boning animal or poultry parts as set forth in claim 11 further including means for adjusting one of the blades in said second set thereof for varying the size of said opening in said second set of blades.

13. Apparatus for boning animal or poultry parts having an elongate bone with a knuckled joint at each end thereof, comprising:

blade means having an adjustable size opening for encircling the bone of said animal or poultry part to strip the meat therefrom, said opening being adjustable to a first predetermined size to accommodate the elongate portion of said bone, and adjustable to a second predetermined size to accommodate the knuckle joint;

means for adjusting the size of said opening to said first or second predetermined sizes;

holding means for holding the bone at one knuckle joint and for pulling said bone through the opening in said blade means;

means operatively associated with said blade means for varying said second predetermined size of said opening which accommodates the knuckle joint; and sensor means responsive to the start of a boning cycle for controlling said means for adjusting to adjust the opening to said first predetermined size, and responsive to the position of said blade means relative to said holding means for controlling said means for adjusting to adjust the opening to said second predetermined size when said blade means is moved from said holding means by a distance substantially equal to the length of the elongate portion of said bone.

* * * * *

UNITED STATES PATENT AND TRADEMARK OFFICE
CERTIFICATE OF CORRECTION

PATENT NO. : 4,495,675
DATED : January 29, 1985
INVENTOR(S) : Carl J. Hill, deceased It is certified that error appears in the above-identified patent and that said Letters Patent is hereby corrected as shown below:

IN THE SUMMARY OF THE INVENTION

In column 2, line 23, please delete "way" (second occurrence) and substitute therefor --away--.

IN THE BRIEF DESCRIPTION OF THE DRAWINGS

In column 3, line 15, please delete "of stripping" and substitute therefor --of the stripping".

IN THE STRUCTURE OF THE INVENTION

In column 7, line 5, please delete "than" and substitute therefor --that--;

In column 7, line 54, please delete "brusing" and substitute therefor --bruising--.

IN THE FUNCTIONAL OPERATION OF THE INVENTION

In column 8, line 21, please delete "throug" and substitute therefor --through--;

UNITED STATES PATENT AND TRADEMARK OFFICE
CERTIFICATE OF CORRECTION

PATENT NO. : 4,495,675
DATED : January 29, 1985
INVENTOR(S) : Carl J. Hill, deceased It is certified that error appears in the above-identified patent and that said Letters Patent is hereby corrected as shown below:

In column 8, line 30, please delete "44a 44b" and substitute therefor --44a, 44b--;

In column 9, line 62, please delete "conveyor)." and substitute therefor --conveyor.)--;

In column 10, lines 12 and 13, please delete "Upon return of the carriage to its initial position.";

In column 10, line 20, please delete "bonded" and substitute therefor --boned--.

Signed and Sealed this

Third Day of May, 1988

Attest:

DONALD J. QUIGG

*Attesting Officer*  *Commissioner of Patents and Trademarks*